United States Patent
Zlotnick

(10) Patent No.: US 8,176,363 B2
(45) Date of Patent: May 8, 2012

(54) EFFICIENT METHOD AND APPARATUS FOR KEEPING TRACK OF IN FLIGHT DATA IN A DUAL NODE STORAGE CONTROLLER

(75) Inventor: Aviad Zlotnick, D.N.G.T. (IL)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/329,965

(22) Filed: Dec. 8, 2008

(65) Prior Publication Data

US 2010/0146348 A1 Jun. 10, 2010

(51) Int. Cl.
G06F 11/00 (2006.01)
G06F 11/20 (2006.01)

(52) U.S. Cl. .......... 714/13; 714/6.2; 714/6.31; 711/161; 711/162

(58) Field of Classification Search ................ 714/6, 15, 714/20, 13, 37, 38.11, 6.2, 6.31; 711/161, 711/162
See application file for complete search history.

(56) References Cited

U.S. PATENT DOCUMENTS

| | | | |
|---|---|---|---|
| 5,619,644 A * | 4/1997 | Crockett et al. | 714/45 |
| 6,178,521 B1 * | 1/2001 | Filgate | 714/6.31 |
| 6,279,078 B1 * | 8/2001 | Sicola et al. | 711/119 |
| 6,360,306 B1 * | 3/2002 | Bergsten | 711/162 |
| 6,363,462 B1 * | 3/2002 | Bergsten | 711/162 |
| 6,823,349 B1 | 11/2004 | Taylor et al. | |
| 6,842,834 B2 | 1/2005 | Crockett et al. | |
| 7,028,218 B2 * | 4/2006 | Schwarm et al. | 714/11 |
| 7,165,141 B2 * | 1/2007 | Cochran et al. | 711/114 |
| 7,188,272 B2 * | 3/2007 | Bartfai et al. | 714/6 |
| 7,210,061 B2 * | 4/2007 | Anderson | 714/5.11 |
| 7,243,190 B2 | 7/2007 | Ash et al. | |
| 7,287,139 B2 | 10/2007 | Budaya et al. | |
| 7,694,091 B2 | 4/2010 | Andrewartha et al. | |
| 7,809,975 B2 * | 10/2010 | French et al. | 714/3 |
| 7,890,715 B2 * | 2/2011 | Burr et al. | 711/162 |
| 2005/0188254 A1 * | 8/2005 | Urabe et al. | 714/6 |
| 2007/0028139 A1 * | 2/2007 | Wahl et al. | 714/6 |
| 2007/0245106 A1 * | 10/2007 | Maki et al. | 711/162 |
| 2008/0016295 A1 * | 1/2008 | Yim et al. | 711/156 |
| 2008/0104443 A1 * | 5/2008 | Akutsu et al. | 714/6 |
| 2008/0276032 A1 * | 11/2008 | Iida et al. | 710/316 |

FOREIGN PATENT DOCUMENTS

JP 2008108257 A 6/2010

* cited by examiner

Primary Examiner — Joseph Schell
(74) Attorney, Agent, or Firm — Cantor Colburn LLP; Yoav Alkalay

(57) ABSTRACT

A storage unit adapted for use in a processing system includes a controller including at least two compute nodes, each of the compute nodes including a read/write cache and a persistent cache; and machine executable instructions stored within machine readable media, the instructions including instructions for tracking in-flight data in the persistent cache and composing a list of the in-flight data segments after a failure of the controller. A processing system and a method are also provided.

4 Claims, 4 Drawing Sheets

--PRIOR ART--

EFFICIENT METHOD AND APPARATUS FOR KEEPING TRACK OF IN FLIGHT DATA IN A DUAL NODE STORAGE CONTROLLER

BACKGROUND

1. Field of the Invention

This invention relates to redundant data storage, and particularly to tracking and resolving differences in write data computing infrastructure using a dual-node controller in a data mirroring system.

2. Description of the Related Art

It is common for data systems of today to use redundant storage. This provides users with high integrity data and great system reliability. However, designs for redundant storage systems are often complicated. Increased demands for performance continue to call for advancements in the design.

For example, in synchronous remote mirroring it is crucial to keep track of differences between the primary storage system and the secondary storage system, even in the presence of failures. For example, consider the following sequence of events, which illustrate potential issues with present day synchronous remote mirroring.

First, a host (i.e., a processor, or other part of a computing system) writes data designated for track T. A primary storage controller then modifies a cache, P, of the primary storage system. As a part of data mirroring, the primary storage controller starts transferring the data associated with track T to a secondary storage controller. Accordingly, a cache of the secondary storage system is then modified. At this time, the primary storage system crashes, and the data for track T in the primary cache is lost. This occurs prior to actual writing of the data in track T to the primary storage disk. As a result, data in the designated storage location of the primary system differs from the data in the secondary system. To compensate for that—once the primary system is restarted, data is copied from the secondary system to the primary system so as to bring the primary system up to date. If the tracks in which the primary and secondary storage controllers differ are not known, all the data has to be copied.

Unfortunately, it can be forbiddingly expensive to copy all of the secondary system back to the primary system.

Accordingly, what are needed are methods and apparatus for maintaining indications of tracks that are different in the primary system and the secondary system. Preferably, the methods and apparatus account for in flight data, and are persistent (i.e., is capable of surviving a system crash).

BRIEF SUMMARY

The shortcomings of the prior art are overcome and additional advantages are provided through the provision a first embodiment of the invention that includes a storage unit adapted for use in a processing system, that includes: a controller including at least two compute nodes, each of the compute nodes including a read/write cache and a persistent cache; and machine executable instructions stored within machine readable media, the instructions including instructions for tracking in-flight data in the persistent cache and composing a list of the in-flight data segments after a failure of the controller.

In another embodiment, the invention includes a processing system that includes: a plurality of mass storage units, at least a first one of the mass storage units including a controller including at least two compute nodes, each of the compute nodes including a read/write cache and a persistent cache; and machine executable instructions stored within machine readable media, the instructions including instructions for tracking in-flight data in the persistent cache and composing a list of the in-flight data segments after a failure of the controller.

In another embodiment, the invention includes a method for storing data in a local mass storage unit, that includes: storing data in a cache of first node of a dual-node controller of the local mass storage unit; copying the data into non-volatile storage of a second node of the controller; sending the data to a remote controller for storage in a remote mass storage unit; waiting for the data to be stored in the local mass storage unit and the remote mass storage unit; and discarding the data in the non-volatile storage upon local and remote writing of the data.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Disclosed herein are methods and apparatus for tracking and resolving differences between primary storage and secondary storage of synchronous remote mirroring systems which may implement a plurality of computing nodes (i.e., at least two computing nodes).

The methods and apparatus provide for minimizing performance degradation during ongoing mirroring and system recovery. The solution provided includes use of non-volatile storage (NVS) of respective storage controllers for tracking writes of data that are "in-flight." In general, data from a host for ongoing or incomplete writing of data is referred to as "in-flight." Information from the non-volatile storage may be used for recovery. In general, a presence of track data in the NVS is regarded as an indication that the track is in flight. As discussed herein, a "track" of data generally makes reference to a block of data that is designated for a particular persistent storage location, such as a designated track on a hard disk. Accordingly, the terms "track" "block" "segment" "sector" "file" and other similar terms are, at least in some respects, synonymous, and are not limiting of the teachings herein.

As a result, the host application at the primary site will experience an improved response time. Care is taken in recovery to ensure that writes do not create an inconsistent state. Having provided this introduction, consider now aspects of a processing system for practicing the teachings herein.

Figure 1:
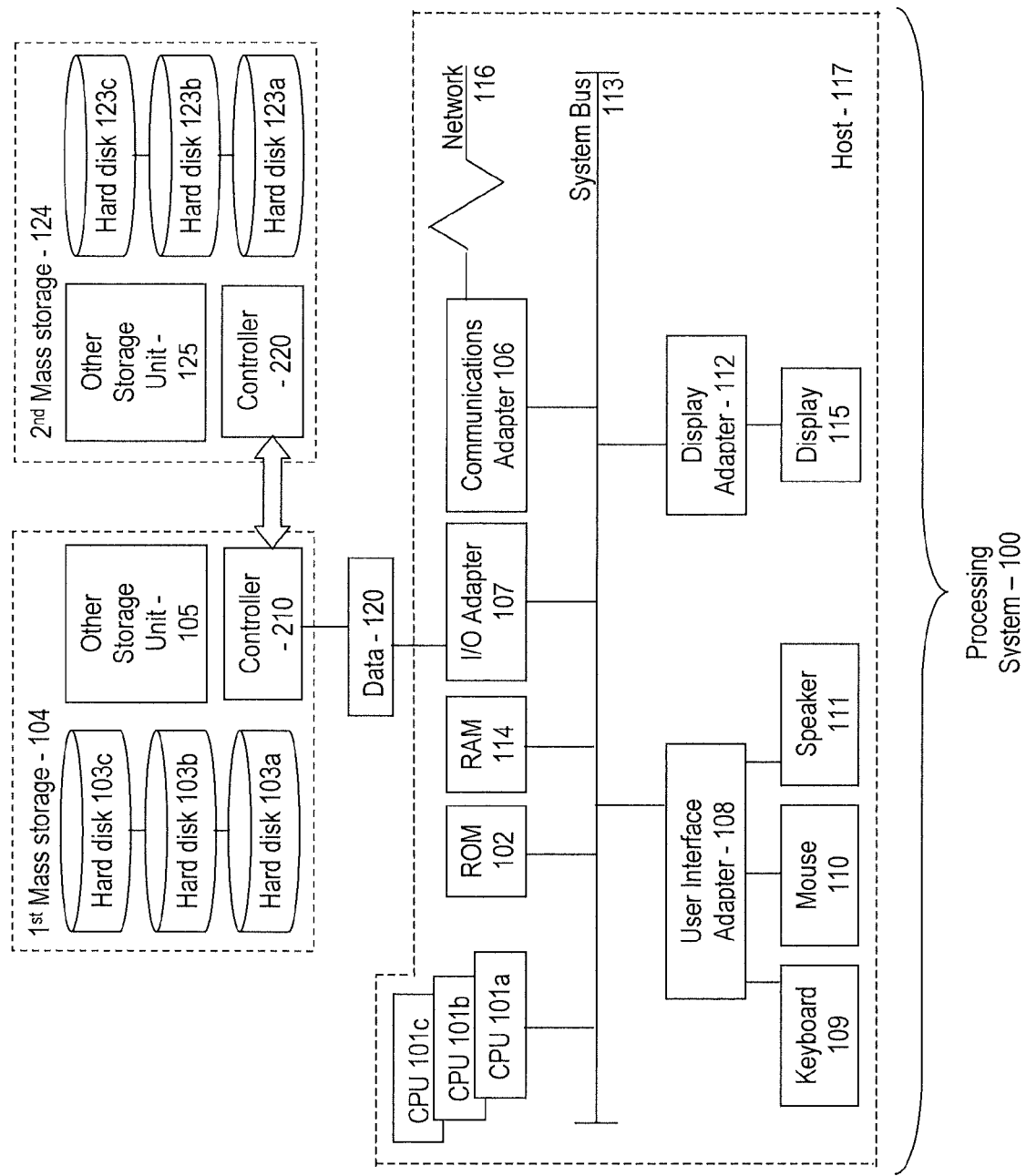
FIG. 1 illustrates one example of a processing system that makes use of a storage system as disclosed herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a first mass storage unit 104. The first mass storage unit 104 may include, for example, a plurality of hard disks 103a, 103b, 103c, etc, . . . and/or another storage unit 105 such as a tape drive, an optical disk, and a magneto-optical disk or any other similar component. Generally, the first storage unit 104 includes a dual node controller 210, which is described in greater depth further herein. A network adapter 106 interconnects bus 113 with an outside network 116 enabling data processing system 100 to communicate with other such systems. A screen (e.g., a display monitor) 115 may be connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional optional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In embodiments where the processing system 100 includes data mirroring capabilities, and as discussed herein, the processing system 100 includes a second mass storage unit 124. For purposes of discussion herein, the second mass storage unit 124 includes the same components as the first mass storage unit 104. The second mass storage unit 124 may also be referred to as a "remote storage unit" and by other similar terms. It should be noted that it is not essential that the second mass storage unit 124 include the same components as the first mass storage unit 104. For example, other types of hard disks 123 or other storage units 125 may be used. In general, however, a remote controller 220 for controlling the second storage unit 124 is also a dual node controller 220, but this is not required.

For convenience of reference, a portion of the processing system 100 that provides data 120 to the first mass storage 104, as well as other functions, is referred to as a "host" 117. In general, transactions involving storage and retrieval of data 120 are performed via communication between the host 117 and the first mass storage 104. Also, the first mass storage 104 provides and/or retrieves data 120 (in the form of tracks, blocks, sectors, files and in other similar forms) to the second mass storage 124. Of course, additional mass storage units may be included, however, for purposes of discussion, the mass storage units are limited to the first and second.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes a network interface 106 for communicating over a network 116. The network 116 can be a local-area network (LAN), a metro-area network (MAN), or wide-area network (WAN), such as the Internet or World Wide Web, or any other type of network 116.

Users of the system 100 can connect to the network 116 through any suitable network interface 106 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

Of course, the processing system 100 may include fewer or more components as are or may be known in the art or later devised.

As disclosed herein, the processing system 100 includes machine readable instructions stored on machine readable media (for example, the hard disk 103). As discussed herein, the instructions are referred to as "software." Software as well as data and other forms of information may be stored in the mass storage 104 as data 120.

Generally, the first mass storage unit 104 includes a controller unit 210, a cache 202, and a backend storage such as the plurality of hard disks 103a, 103b, 103c. Non-volatile storage 203 (i.e., memory, which may include persistent memory) may be included as an aspect of the controller unit 210, or otherwise included within the storage 104. The backend storage generally includes persistent machine readable media for storing at least one of software 120, data and other information as electronic information.

As is known in the art, the controller unit 210 generally includes instructions for controlling operation of the first mass storage unit 104. The instructions may be included in firmware (such as within read-only-memory (ROM)) on board the controller unit 210, as a built-in-operating-system for the first mass storage unit 104 (such as software that loads to memory of the controller unit 210 when powered on), or by other techniques known in the art for including instructions for controlling the first mass storage unit 104.

With regard to the prior art, and to establish context for the teachings herein, it should be noted that in some controllers 210, a significant speed-up of host write operations is achieved by using two compute nodes, each with a read/write cache 202 and a persistent write cache (hence referred to as the Non Volatile Storage, NVS 203). Each host write is written to one node's read/write cache 202 and to the other's NVS 203. When this is complete, the written data is recoverable even if one of the nodes fails, and the host 117 is presented a successful status. When the written data is copied from the first node's read/write cache 202 to a disk (a destage operation), the corresponding entry in the NVS 203 is deleted. Consider the following example in FIG. 2.

Figure 2:
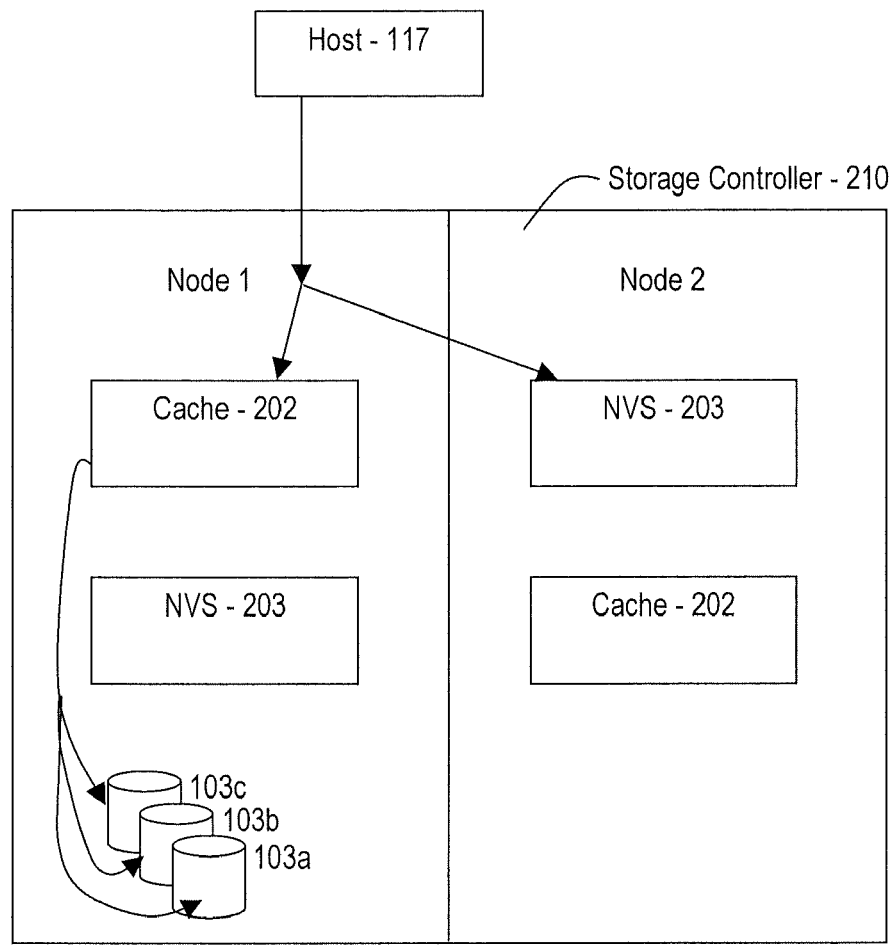
FIG. 2 illustrates aspects of a prior art storage controller.

In the prior art example of FIG. 2, the controller unit 210 includes a plurality of nodes (in this example, two nodes, or is a dual-node controller 210). Each node includes the cache 202, non-volatile storage 203 and backend storage 201. In this example, transfer of data involved writing a given block of data to the cache 202 of Node 1, and to the NVS of Node 2. After the block of data was written to disk in Node 1, the block of data is discarded from the NVS of Node 2.

In some controllers 210, communication between the two compute nodes is relatively expensive. Maintaining an Out-Of-Sync structure by sending messages back and forth between the two nodes may have an impact on good path performance.

Figure 3:
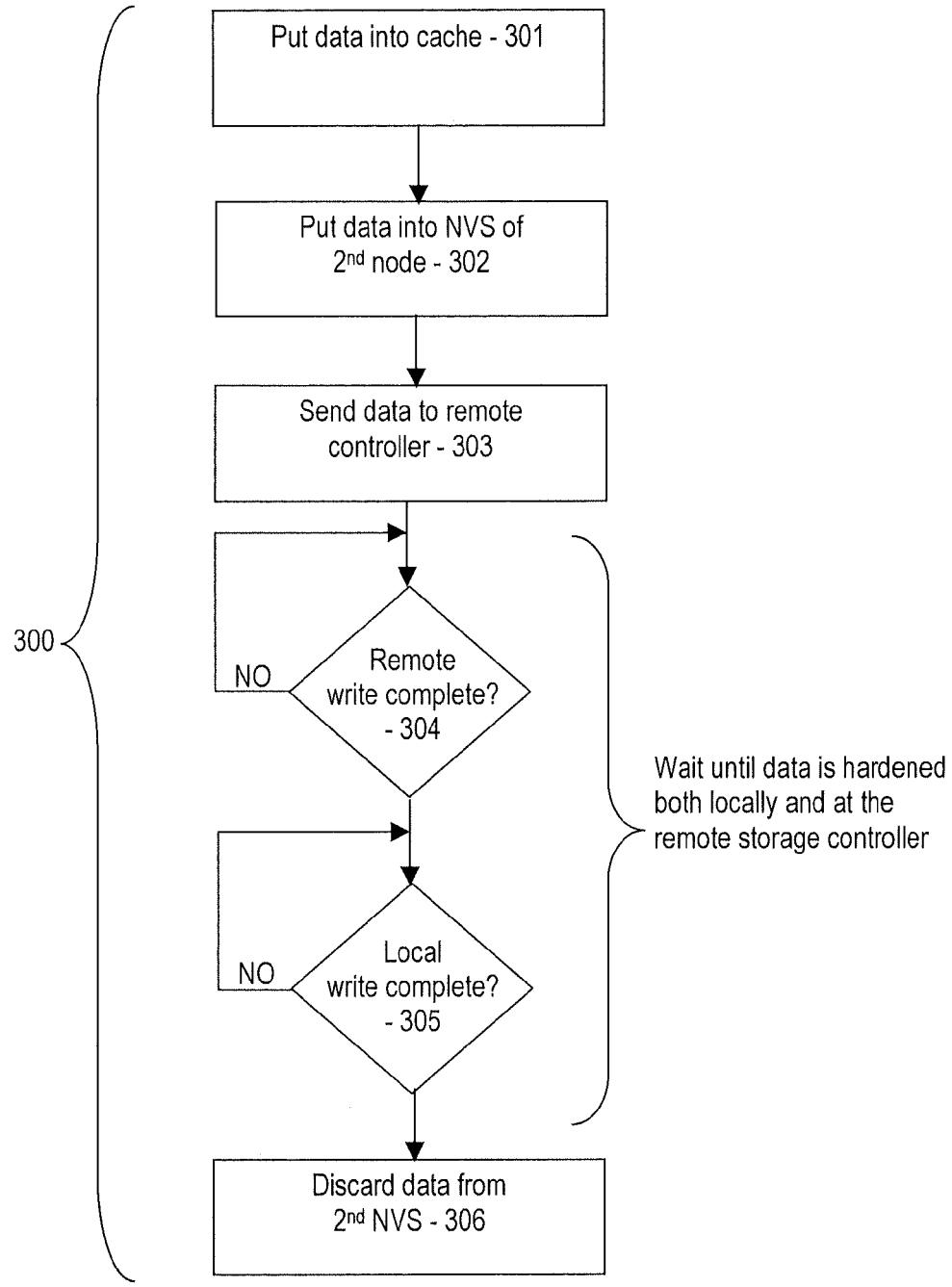
FIGS. 3 and 4 provide flow charts illustrating processes for tracking write data and recovering from failed writes.
Figure 4:
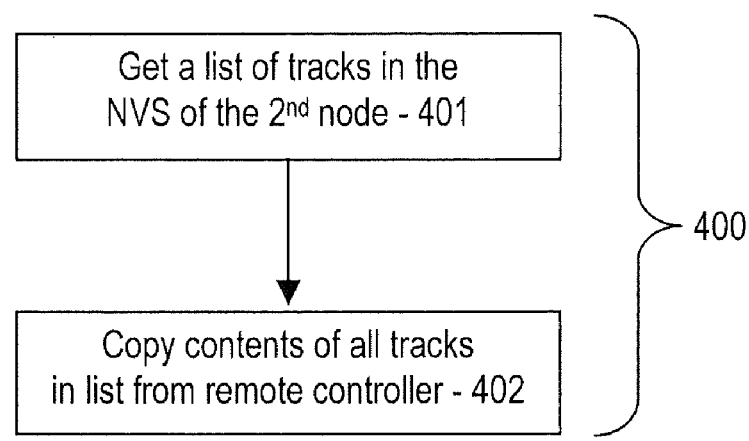

In general, and by way of convention, instructions for keeping track of in-flight data are referred to as providing for "write tracking." In general, write tracking identifies a presence of an in-flight write of a segment of data in the NVS 203 as a persistent indication. If the segment of data identified in the primary storage system and the secondary storage system differs, then either an associated non-volatile Out-Of-Sync (OOS) bit is on, or the data has a copy in the NVS 203. Refer now to FIGS. 3 and 4 for a more detailed explanation of write tracking.

In FIG. 3, there are shown aspects of a method for storing data 300. The method for storing data 300 ensures high integrity of data for a multi-node controller (such as a dual node controller) used in a remote data mirroring storage system.

In a first stage 301 of the method for storing data 300, the controller loads the first cache with the block of data. In a second stage 302, the controller loads the same block of data into the non-volatile storage of the second node. In a third stage 303, the block of data is then sent to a remote storage controller. In a fourth stage 304, the local controller will then test for completion of writing of data in the remote storage. Similarly, in a fifth stage 305, the local controller tests for completion of writing of data to the local disk. If at least one of the fourth stage 304 and the fifth stage 305 have not been completed, then the controller will wait for completion of writing of data in both local and remote locations. Stages 304 and 305 can be done concurrently. In a sixth stage 306, once local and remote writing has been completed, the block of data is discarded from the non-volatile storage in the second node.

With regard to FIG. 4, there are shown aspects of a method for recovery of data 400 after a failure of, for example, the first node of the local controller 210. In a first stage 401, the local controller gets a list of tracks of data from the non-volatile storage of the second node. In a second stage 402, the local controller then requests the associated data from the remote controller, receives and writes the data to local storage.

In some embodiments, when a transfer to the second mass storage unit 124 fails, the cache entry of the untransferred segment(s) of data may be marked, using a single bit. When destaging a marked track, before freeing the associated copy in the NVS 203, the OOS bit is set and made persistent.

In some embodiments tracks are not destaged on the first node and discarded from NVS 203 on the second node immediately after the transfer to the secondary. In such embodiments tracks in NVS 203 are considered in flight until marked as successfully transferred. When N segments of data have been successfully transferred, a message is sent to the NVS 203 to mark associated NVS entries for these N segments of data as successfully transferred. This message can be asynchronous (destaging the tracks does not have to wait for a successful return status)—a failure would have a small impact on failback time, but not cause an integrity problem. N can be 1 for simplicity, or more for performance optimization. During failback (a recovery of the first node) the OOS bit is set for any in-flight data that has a copy in NVS and belongs to a mirrored volume and is not marked as successfully transferred. This scheme has the advantage of adding overhead mostly outside the host input/output path.

The capabilities of the present invention can be implemented in software, firmware, hardware or some combination thereof As an example, the controller unit 210 may implement the instructions as machine executable instructions loaded from at least one of backend storage, non-volatile storage 203, local read-only-memory (ROM) and other such locations One or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for storing data in a local mass storage unit, the method comprising:
   storing data in a first cache of a first node of a dual-node controller of the local mass storage unit, the dual-node controller comprising the first node and a second node, wherein the first node comprises the first cache and a first non-volatile storage and the second node comprises a second cache and a second non-volatile storage;
   copying the data into the second non-volatile storage of the second node of the dual-node controller;
   sending the data to a remote controller for storage in a remote mass storage unit;
   waiting for the data to be stored in the local mass storage unit and the remote mass storage unit;
   discarding the data in the second non-volatile storage upon local and remote writing of the data;
   wherein the data both stored in the first cache of the first node and copied into the second non-volatile storage of the second node is in-flight data which is ongoing data from a host; and
   tracking the in-flight data in the second non-volatile storage of the second node as in-flight data segments and composing a list of the in-flight data segments in the second non-volatile storage in response to a failure of the first node of the dual-node controller.

2. The method as in claim 1, further comprising:
after a failure of the dual-node controller and during a recovery of the local mass storage unit, getting the list of in-flight data segments in the second non-volatile storage of the second node; and
copying contents of the in-flight data segments from the remote mass storage unit to the local mass storage unit.

3. The method as in claim 1, wherein waiting comprises testing for completion of a write to the remote mass storage unit.

4. The method as in claim 1, wherein waiting comprises testing for completion of a write to the local mass storage unit.

* * * * *